(12) United States Patent
Inaba et al.

(10) Patent No.: US 11,436,394 B2
(45) Date of Patent: Sep. 6, 2022

(54) POTTS MODEL CALCULATION DEVICE

(71) Applicant: Nippon Telegraph and Telephone Corporation, Tokyo (JP)

(72) Inventors: Kensuke Inaba, Atsugi (JP); Hiroki Takesue, Atsugi (JP); Toshimori Honjo, Atsugi (JP); Takahiro Inagaki, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 372 days.

(21) Appl. No.: 16/757,246

(22) PCT Filed: Oct. 19, 2018

(86) PCT No.: PCT/JP2018/038997
§ 371 (c)(1),
(2) Date: Apr. 17, 2020

(87) PCT Pub. No.: WO2019/078355
PCT Pub. Date: Apr. 25, 2019

(65) Prior Publication Data
US 2020/0279062 A1    Sep. 3, 2020

(30) Foreign Application Priority Data

Oct. 19, 2017  (JP) ............................. JP2017-202986

(51) Int. Cl.
*H04B 10/00* (2013.01)
*G06F 30/20* (2020.01)
(Continued)

(52) U.S. Cl.
CPC ............ *G06F 30/20* (2020.01); *G06E 3/005* (2013.01); *G06E 3/008* (2013.01); *G06F 17/18* (2013.01); *G06N 10/00* (2019.01); *G06F 2111/10* (2020.01)

(58) Field of Classification Search
CPC .......... G06E 3/00; G06E 3/001; G06E 3/005; G06E 1/00; G06E 1/04; G06E 1/06
See application file for complete search history.

(56) References Cited

U.S. PATENT DOCUMENTS

2017/0024658 A1    1/2017   Utsunomiya et al.
2017/0068632 A1*   3/2017   Yoshimura .......... G06F 13/4068

FOREIGN PATENT DOCUMENTS

WO        2015/156126 A1    10/2015

OTHER PUBLICATIONS

International Search Report dated Jan. 8, 2019, issued in PCT Application No. PCT/JP2018/038997, filed Oct. 19, 2018.
(Continued)

*Primary Examiner* — Daniel G Dobson
(74) *Attorney, Agent, or Firm* — Workman Nydegger

(57) ABSTRACT

A Potts model computing device capable of computing a Potts problem that is a multivalued spin problem are described herein. The Potts model computing device includes: an Ising model computing device; a computation result storage and determination unit configured to store a value of a spin of the Ising model obtained in a case where a coupling coefficient is set in the Ising model computing device and to determine whether a computation is finished; and a coupling coefficient overwriting unit configured to update a coupling coefficient generated based on the stored value of the spin to the Ising model computing device. According to a value of a set of spins obtained as a computation result corresponding to a coupling coefficient
(Continued)

$J_{ij}=1$

GRAPH NODE NUMBER : L=7 set for an m-th time in the Ising model computing device, the coupling coefficient overwriting unit generates again a coupling coefficient to be set for an (m+1)-th iterative computation.

6 Claims, 11 Drawing Sheets

(51) Int. Cl.
*G06E 3/00* (2006.01)
*G06F 17/18* (2006.01)
*G06N 10/00* (2022.01)
*H04J 14/00* (2006.01)
*G06F 111/10* (2020.01)

(56) References Cited

OTHER PUBLICATIONS

Takahiro Inagaki et al., *A Coherent Ising Machine for 2000-node Optimization Problems*, Science, Nov. 4, 2016, vol. 354, No. 6312, pp. 603-607.
F.Y. Wu, *The Potts Model*, Rev. Mod. Phys., 1982, vol. 54, No. 1, pp. 235-268.

\* cited by examiner

GRAPH NODE NUMBER : L=7

ARRANGE IN ALL LAYERS

POTTS MODEL CALCULATION DEVICE

TECHNICAL FIELD

The present invention relates to a Potts model computing device which simulates the Potts model using optical pulses.

BACKGROUND ART

A conventionally-known von Neumann computer cannot efficiently solve a combinatorial optimization problem classified as an NP problem. As a method of solving a combinatorial optimization problem, there is proposed a method using the Ising model, which is a lattice model for a statistical mechanics analysis of a magnetic material as an interaction between spins arranged in respective sites of a lattice.

It is known that a Hamiltonian H, which is an energy function in the Ising model, is expressed by the following formula (1).

$$H = \Sigma_{ij} J_{ij} \sigma_i \sigma_j \quad (1)$$

Here, $J_{ij}$ is a coupling coefficient indicating a correlation between spins on I and j th sites. $\sigma_i$ and $\sigma_j$ represent spins of the sites and each take on a value of 1 or −1.

In the case of using the Ising model to solve a combinatorial optimization problem, an optimum solution can be attained by obtaining $\sigma_i$ at which the system is in a stable (ground) state and the value of energy H is the lowest when the Hamiltonian of the Ising model is provided with $J_{ij}$, the interaction between the sites. In recent years, attention is being given to a computing device capable of solving a combinatorial optimization problem such as an NP problem by simulating the Ising model using optical pulses (see PTL 1 and NPL 1).

FIG. 1 is a diagram showing a basic configuration of an Ising model computing device. As shown in FIG. 1, the Ising model computing device is configured to generate a train of optical pulses corresponding to the number of sites of the Ising model by injecting a pump optical pulse (pump) into a phase sensitive amplifier (PSA) 2 provided in a ring-shaped optical fiber which functions as a ring resonator 1 (binary optical parametric oscillator [OPO]; 0 or π phase optical parametric oscillator). If the optical pulse train input to the ring resonator 1 circulates to reach the PSA 2 again, the pump light is input to the PSA 2 again, whereby the optical pulse train is amplified. The optical pulse train generated by the first injection of the pump light includes weak pulses with an unstable phase, and is amplified by the PSA 2 each time it circulates through the ring resonator 1, whereby the phase state is gradually determined. Since the PSA 2 amplifies each optical pulse in the 0 or π phase with respect to the phase of the pump light source, the pulse is determined in either of the phases.

The Ising model computing device implements 1 and −1 of the spins in the Ising model in association with the 0 and π phases of the optical pulses. The phases and amplitudes of the optical pulse train are measured by a measurement unit 3 outside the ring resonator 1 each time the optical pulses circulate, and the measurement result is input to an arithmetic unit 4 provided with the coupling coefficient $J_{ij}$ in advance and is used to compute a coupling signal (feedback input signal) for the i-th pulse, $$\Sigma_j J_{ij} c_j$$

($c_j$ is the amplitude of an optical pulse in the j-th site).

Further, the computed coupling signal is used to make a correlation between optical pulses forming the optical pulse train by generating an external optical pulse according to the coupling signal computed by an external optical pulse input unit 5 and inputting the external optical pulse to the ring resonator 1.

The Ising model computing device can obtain a solution of the Ising model by circulating and amplifying the optical pulse train in the ring resonator 1 while providing the correlation described above, and measuring the 0 and π phases of the respective optical pulses forming the optical pulse train in a stable state.

CITATION LIST

Patent Literature

PTL 1: International Publication No. WO 2015/156126

Non Patent Literature

NPL 1: T. Inagaki, Y. Haribara, et al., "A coherent Ising machine for 2000-node optimization problems," Science 354, 603-606 (2016)
NPL 2: Wu, Fa-Yueh (1982), "The Potts model," Rev. Mod. Phys. 54 (1): 235-268

SUMMARY OF INVENTION

Technical Problem

Incidentally, a solution to an Ising problem that can be solved by the Ising model computing device is either of binary spins. However, there are a number of combinatorial optimization problems in which a spin to be a solution takes one of more than two values (multiple values), so-called Potts problems (multivalued spin problems). Multivalued Potts problems with more than two values cannot be directly solved by the Ising model computing device, which deals with binary problems. However, since Potts problems that are multivalued problems are widely applicable, there has been a need for a device capable of computing the Potts model (NPL 2) for solving multivalued combinational optimization problems.

The present invention has been accomplished in view of the conventional problem described above. An object of the present invention is to provide a Potts model computing device capable of computing a Potts problem that is a multivalued spin problem.

Solution to Problem

To achieve the object, the invention according to one embodiment is a Potts model computing device comprising: A Potts model computing device comprising: an Ising model computing device; a computation result storage and determination unit configured to store a value of a set of spins of the Ising model obtained in a case where a coupling coefficient is set in the Ising model computing device and to determine whether a computation is finished; and a coupling coefficient overwriting unit configured to update a coupling coefficient generated based on the stored value of the set of spins to the Ising model computing device, wherein, according to values of the spins of the Ising model obtained as a computation result for an m-th time iterative computation using the Ising model computing device, the coupling coefficient overwriting unit generates a coupling coefficient to be set for an (m+1)-th time computation and updates the generated coupling coefficient to the Ising model computing device, the computation result storage and determination unit determines that a computation is finished in a case where a number of iteration times reaches to Ms (Ms is a natural number), and computes a value $S_i$ by substituting a value $\sigma_{i\,m}$ of a spin obtained as a computation result of the m-th time iterative Ising model computation into the following formula to compute a problem mapped to the Potts model using the Ising model computing devices:

$$S_i = \Sigma_{m=1}^{Ms}(1+\sigma_{im})2^{m-2}$$

wherein a possible value of a multivalued spin of the Potts model is $S_i=0, 1, 2, \ldots, M-1$ (M is a natural number) and $M \leq 2^{M\,S}$.

DESCRIPTION OF EMBODIMENTS

Figure 1:
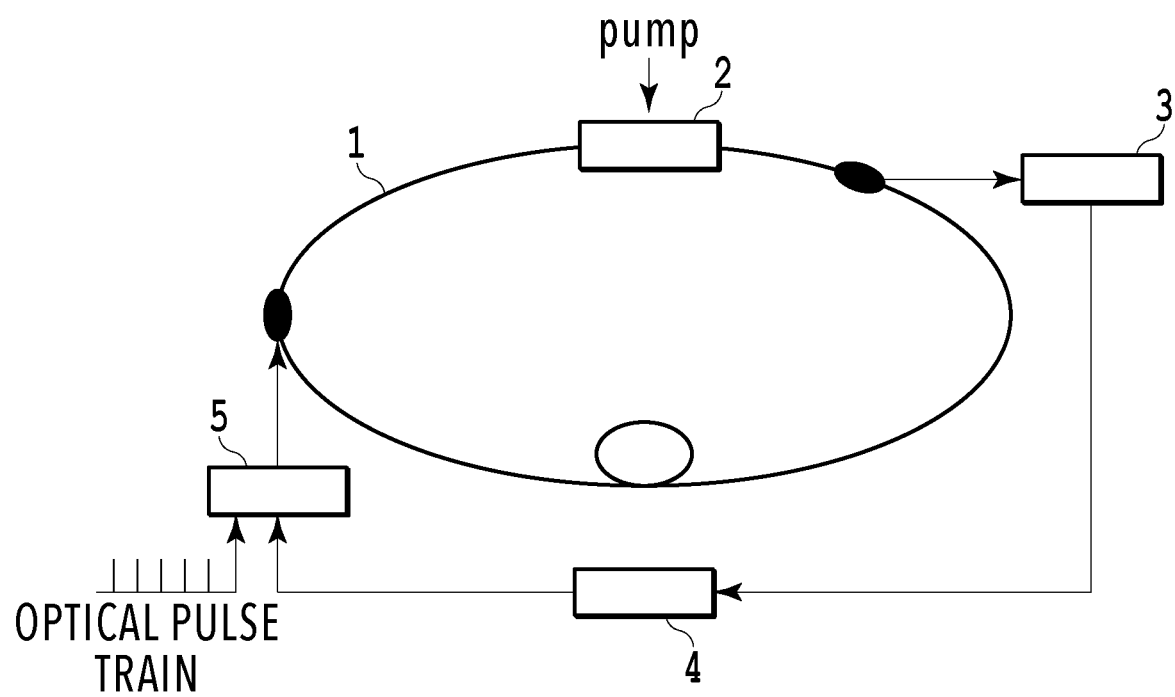
FIG. 1 is a diagram showing a basic configuration of a conventional Ising model computing device.

Embodiments of the present invention will be described in detail.

Potts Model

A Potts problem (multivalued spin problem) dealt with in a Potts model computing device of the present embodiment can be solved using the Hamiltonian of the following formula (2) called Potts model. In the formula (2), a value of a multivalued spin in a site (node) i forming the Potts model is represented by $S_i$ ($S_i=0, 1, 2, 3 \ldots, M-1$; M is a natural number indicating a multivalued number), and a coupling coefficient indicating a correlation between sites (nodes) forming the Potts model is represented by $J_{ij}$ (i, j=1, 2, ... N; indices indicating sites; N indicates the number of sites). The Kronecker delta $\delta(S_i-S_j)$ is 1 only when $S_i=S_j$ and is 0 in other cases.

$$H_{Potts} = \Sigma_{ij} J_{ij} \delta(S_i-S_j) \quad (2)$$

In the case of solving the Potts problem, a problem to be solved is mapped to $J_{ij}$ in the formula (2). When the multivalued number can be expressed as $M=2^{M\,S}$, the formula (2) describing a multivalued spin problem can be rewritten as the following formula (3) by using binary Ising spins $\sigma^{i\,m}$, $\sigma_{j\,m} = (\pm 1)$ with a degree ranging from 1 to Ms. $\sigma_{j\,m}$ indicates a binary spin value in the site j whose interaction with the site i having a binary spin value $\sigma_{i\,m}$ with the degree m is considered.

$$H_{Potts} = \Sigma_{ij} J_{ij} \Pi_{m=1}^{M_s} \left( \frac{1+\sigma_{im}\sigma_{jm}}{2} \right) \quad (3)$$

The product of the binary spin interactions in the formula (3) can be rewritten as shown by the following formula (4).

$$H_{Potts} = \Sigma_{ij} J_{ij} \left( \frac{1+\sigma_{i1}\sigma_{j1}}{2} \right)\left( \frac{1+\sigma_{i2}\sigma_{j2}}{2} \right)\left( \frac{1+\sigma_{i3}\sigma_{j3}}{2} \right) \quad (4)$$

The formula (4) shows that $(1+\sigma_{im}\sigma_{jm})/2$ in each of the m-th order terms is equivalent to a binary Ising problem expressed by the formula (1) except for the addition and multiplication of constants (any constants do not affect a solution of the Ising problem). That is, the Potts problem of the multivalued number $M (=2^{M\,S})$ can be represented by the product of Ms binary Ising problems. More specifically, in order to derive an interaction between multivalued spins (Potts interaction), it is necessary to consider the Ms product of the Ising interactions (first interaction) between binary spins $\sigma_{i\,m}$, $\sigma_{j\,m}$ in each of the m-th order terms as well as an interaction (second interaction) provided by the infinite product of the first interactions. At this time, the value $S_i$ of the multivalued spin having the Potts interaction can be expressed by the following formula (5) using the Ms m-th order binary spins $\sigma_{i\,m}$ in the formulae (3) and (4).

$$S_i = \Sigma_{m=1}^{M_s}(1+\sigma_{im})2^{m-2} \quad (5)$$

Accordingly, the value of the multivalued spin $S_i$ to be solved in the Potts problem can be obtained by obtaining the value of the m-th order binary spin $\sigma_{i\,m}$ when the Ising-like Hamiltonian in the formulae (3) or (4) is brought into a stable state. Further, according to the formulae (3) and (4), the multivalued spin can be determined by obtaining Ms sets of values of N binary spins $\sigma_{i\,m}$, $\sigma_{j\,m}$ (i, j=1, 2, ... N; indices indicating sites; N represents the number of sites). That is, a problem mapped to the Potts model can be computed by substituting (simulating) the binary spins $\sigma_{i\,m}$, $\sigma_{j\,m}$ (i, j= 1, 2, ... N) with phases of optical pulses (such as 0, π) and providing the phases of the optical pulses with the Potts interaction.

This transformation for the Potts model Hamiltonian will be further described by giving an example of a map coloring problem. Coloring Kyushu with eight colors can be regarded as a multivalued problem in which values from 0 to 7 are assigned to the respective colors used for coloring. The problem can be expressed by using three sets of binary spins $\sigma_{i\,m}$, $\sigma_{j\,m}$, where $M=8=2^3$, that is, m=1, 2, 3 (i, j=1, 2, ... N; indices indicating sites; N represents the number of sites).

Figure 2A:
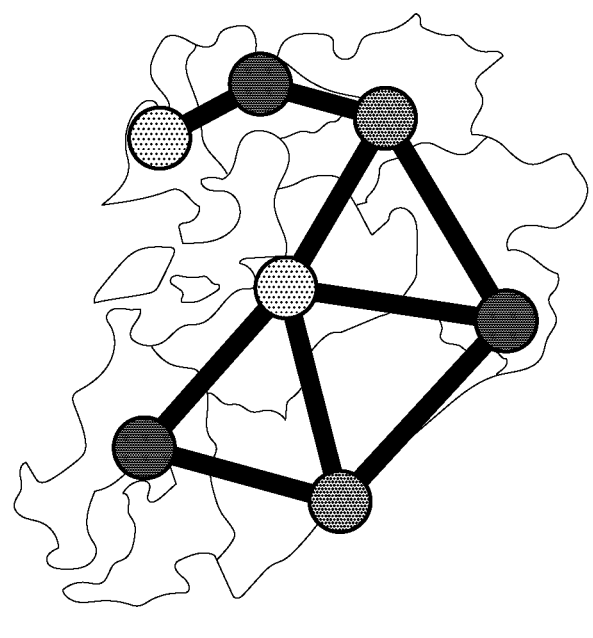
FIG. 2A is a diagram in which a problem of coloring Kyushu with eight colors using respective prefectures as nodes is replaced with a Potts problem as an example.
Figure 2B:
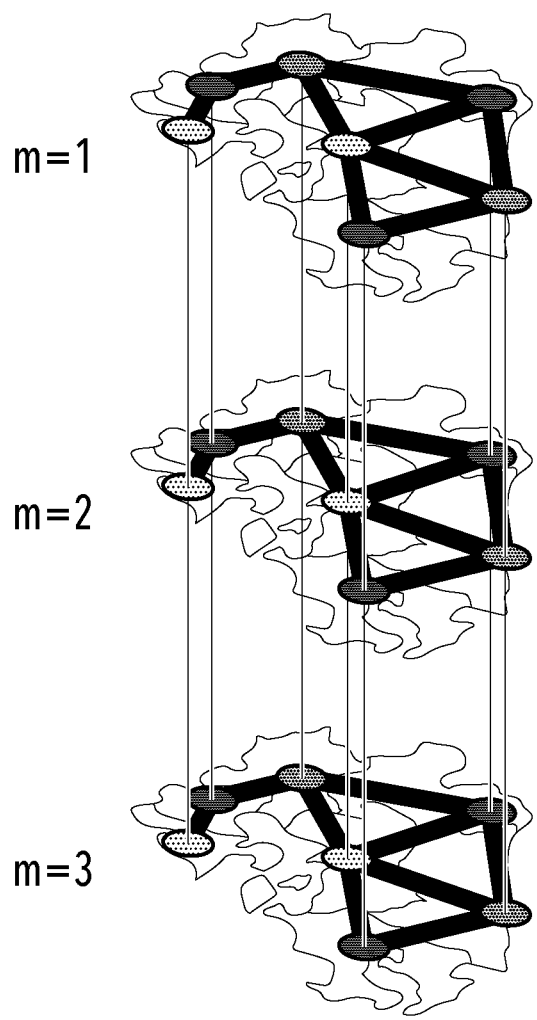
FIG. 2B is a diagram showing the Potts problem of FIG. 2A separated into three-layer graph problems.
Figure 2C:
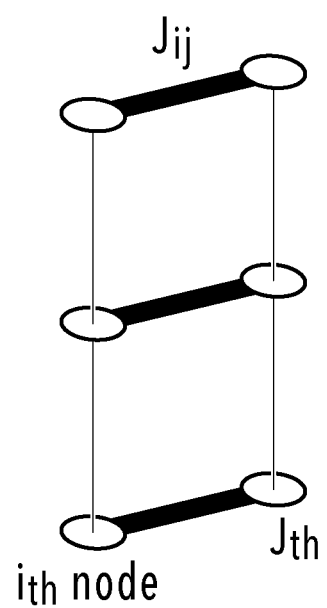
FIG. 2C is a diagram showing a relationship between the three-layer graph problems and a Potts interaction.

FIG. 2A, FIG. 2B, and FIG. 2C are diagrams illustrating the Potts interaction in the problem of coloring Kyushu with eight colors using respective prefectures as sites shown as an example. The Potts Hamiltonian for this problem with the three sets of binary spins $\sigma_{i\,m}$, $\sigma_{j\,m}$ have an interaction can be described by the graph shown in FIG. 2B in which the original graph of Kyushu shown in FIG. 2A is copied into three layers in order to consider the Potts interaction. In this coloring problem, whether two sites (prefectures) are adjacent to each other is set to $J_{ij}$ as a correlation. This becomes a problem to be solved. For example, on the assumption that Nagasaki Prefecture is i=1 and Saga Prefecture is j=2, since these two prefectures are adjacent to each other, $J_{1\,2}=1$ indicating adjacency is set as a correlation. In FIG. 2A and FIG. 2C, Nagasaki and Saga are connected by a thick line, which indicates the correlation.

First, two specific adjacent sites in each layer in the graph shown in FIG. 2B will be considered. It is determined that there is an interaction if the values of spins of two sites on each layer are equal to each other on all of three layers and it is determined that there is no interaction if spins of two sites on each layers are different from each other. The presence/absence of an interaction between the two adjacent nodes is determined in each of the three layer. If it is determined that "there is no interaction" in any one of the layers, it is determined that there is no Potts interaction between the two nodes. That is, it can be determined that there is a Potts interaction if the values of the adjacent nodes are equal to each other in all the layers as shown in FIG. 2C.

In the eight color coloring problem, each site can take on eight values. However, adjacent sites should be colored with different colors. In other words, as to adjacent sites, a solution to the problem is a set of multivalued spins $S_i$ obtained by substituting the values ($\pm 1$) of the sites in each layer into formula (5) in the case where Potts interaction is absent on whole sites.

The multivalued problem can be solved by substituting (emulating) the values ($\pm 1$) in each layer in the graph of multiple layers described in this problem with phases of optical pulses (such as 0, $\pi$).

First Embodiment

Figure 3:
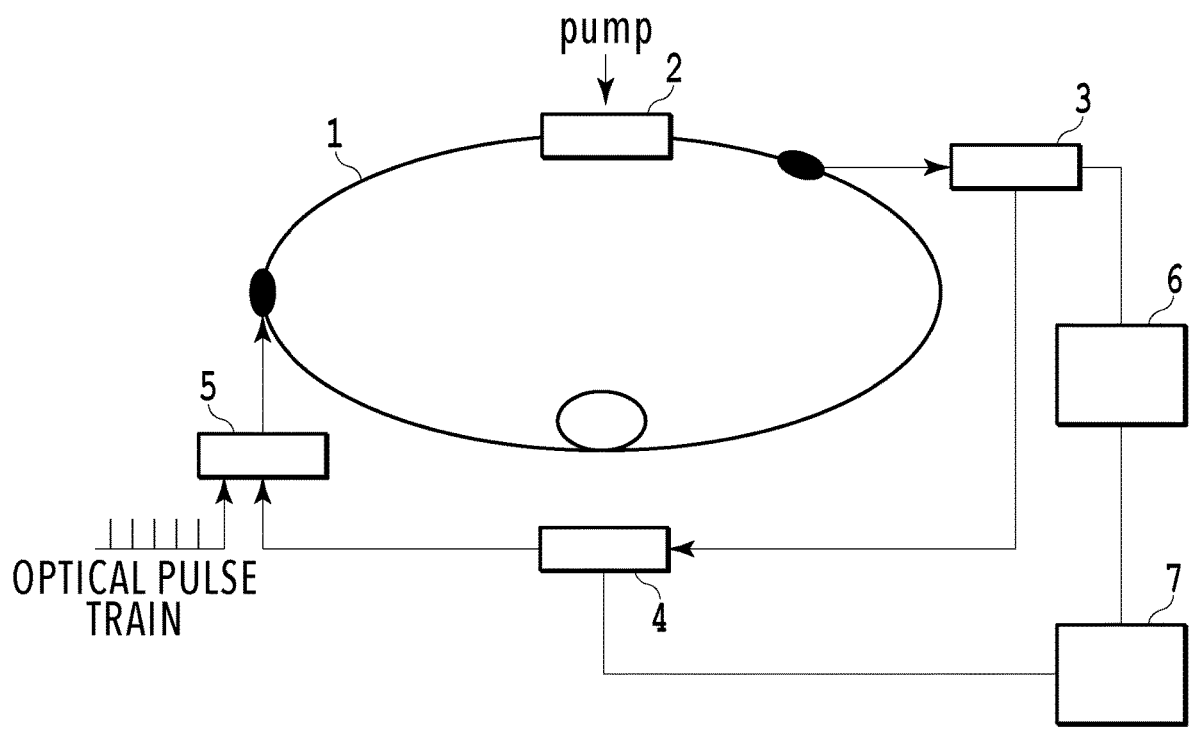
FIG. 3 is a diagram showing a schematic configuration of an Ising model computing device of the present embodiment.

FIG. 3 is a diagram showing a schematic configuration of a Potts model computing device of the present embodiment. In FIG. 3, the Potts model computing device has a ring resonator 1 formed by a ring-shaped optical fiber, a phase sensitive amplifier (PSA) 2 provided in the ring resonator 1, a measurement unit 3, an arithmetic unit 4, and an external optical pulse input unit 5 forming part of a feedback loop branching from the ring resonator 1, a computation result storage and determination unit 6 which stores a computation result corresponding to a coupling coefficient and determines whether a computation is finished, and a coupling coefficient overwriting unit 7 which sets a coupling coefficient by updating the value of $J_{ij}$ written to the arithmetic unit 4 according to the measurement unit 3. In the Potts model computing device of the present embodiment, a feedback loop is formed by the measurement unit 3, the arithmetic unit 4, and the external optical pulse input unit 5. In this configuration, a so-called Ising model computing device is formed by the ring resonator 1, the PSA 2, the measurement unit 3, the arithmetic unit 4, and the external optical pulse input unit 5. The computation result storage and determination unit 6 and the coupling coefficient overwriting unit 7 which can be formed by, for example, an external computer having a CPU and a storage unit such as a memory.

The PSA 2 efficiently amplifies light of the 0 or $\pi$ phase with respect to the phase of the pump light source (to be exact, local light used for pump light pulse generation) out of a train of optical pulses having the same oscillation frequency which simulates a spin set of the Ising model. The PSA 2 can be formed by using a nonlinear optical crystal such as periodically poled lithium niobate (PPLN) having a second-order nonlinear optical effect.

If signal light and pump light (excitation light) are input, the PSA 2 generates a weak pulse (idler light) in the 0 or $\pi$ phase with respect to the phase of the pump light source. Even if only pump light is first input before generation of signal light, the PSA 2 can generate a weak pulse (noise optical pulse) as spontaneous emission light.

If pump light obtained by converting local oscillator light (LO light) having a frequency $\omega$ into second harmonic light having a frequency $2\omega$ by a second harmonic generator is input (if there has been no pump light and input of pump is just starting), the PSA 2 generates weak noise light through a parametric down-conversion process. Further, if an optical pulse train that has circulated and propagated through the ring resonator 1 is input to the PSA 2 again, the optical pulse train becomes signal light, $$E_s = A_s e^{i(\omega_s t + \theta_s)}$$

and if the pump light completely phase-matched to the signal light, $$E_p = A_p e^{i\omega_p t}$$

is further input to the PSA 2, idler light to be phase conjugate light of the signal light Es, $$E_i = A_i e^{i\{(\omega_p - \omega_s)t - \theta_s\}}$$

is generated by optical parametric oscillation (OPO), which is the second-order nonlinear optical effect.

At this time, if the frequency of the signal light corresponds to that of the idler light, the following degenerate wave is output.

$$E_s = A_s e^{i(\omega_s t + \theta_s)} + A_s e^{i(\omega_s t - \theta_s)} = 2A_s e^{i\omega_s t}\cos\theta_s$$

Since the output degenerate wave is obtained by addition of the signal light and the idler light in the phase conjugation relationship, a 0 or $\pi$ phase wave is efficiently amplified. Thus, the PSA 2 amplifies 0 or $\pi$ phase components of the weak optical pulse train generated first.

The ring resonator 1 causes a plurality of optical pulses (optical pulse train) generated in the PSA 2 to circulate and propagate. The ring resonator 1 can be formed by a ring-shaped optical fiber. The length of the optical fiber is set at a value obtained by adding a length corresponding to a time required for feedback processing to (the number of pulses forming the optical pulse train)×(a pulse interval).

The measurement unit 3 functions as an optical pulse measurement unit that measures the phases and amplitudes of a plurality of optical pulses (optical pulse train) each time the optical pulses circulate through the ring resonator 1 (for each circulation). More specifically, the measurement unit 3 causes the optical pulse train propagating through the ring resonator 1 to branch and makes a coherent measurement of the phase state including amplitudes. The coherent measurement can measure the amplitudes and phases of the optical pulse train input as light to be measured by means of a balanced homodyne detector.

Figure 4:
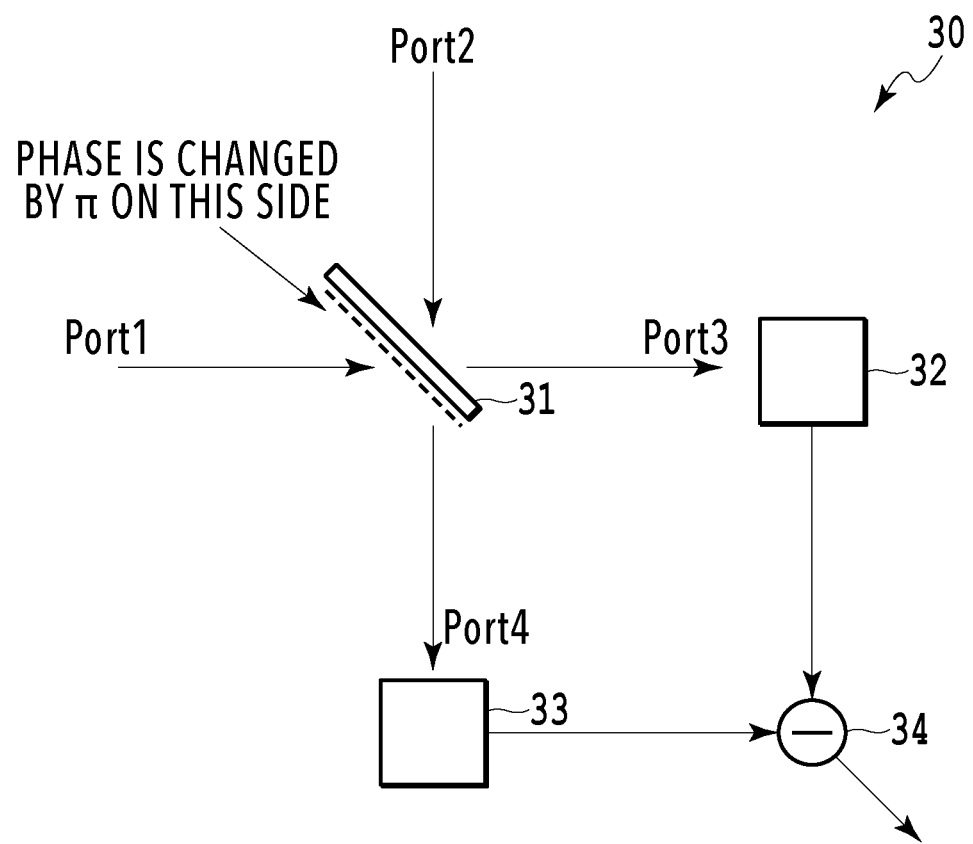
FIG. 4 is a diagram showing a configuration example of a balanced homodyne detector.

FIG. 4 is a diagram showing a configuration example of a balanced homodyne detector 30. The balanced homodyne detector 30 can set, as reference light, phase-locked light having the same frequency as an optical pulse train to be measured, cause the reference light to interfere with light forming the optical pulse train, and measure the amplitude and phase state of the optical pulse train. The balanced homodyne detector 30 has a half mirror 31 which causes light from a port 1 and light from a port 2 to interfere with each other and outputs them to a port 3 and a port 4, a first photodetector 32 which detects light output from the port 3, a second photodetector 33 which detects light output from the port 4, and a difference computing unit 34 which computes a difference between the detection results of the first and second photodetectors 32 and 33.

An optical pulse train $E_s e^{i(\omega t + 0)}$ is input to the port 1 as light to be measured and reference light $E_{L\,o}\, e^{i\omega t}$ whose amplitude and phase are known is input to the port 2. The optical pulse train input to the port 1 branches at the half mirror 31 into an in-phase component transmitted toward the port 3 and a component reflected toward the port 4 with a phase changed by $\pi$. The reference light input to the port 2 branches at the half mirror 31 into an in-phase component transmitted toward the port 4 and an in-phase component reflected toward the port 3.

Output light obtained by interference between the in-phase component of the optical pulse train input to the port 1 and the in-phase component of the reference light input to the port 2, $$E_3 = \frac{E_{LO}}{\sqrt{2}} e^{i\omega t} + \frac{E_s}{\sqrt{2}} e^{i(\omega t + \theta)}$$

is output from the port 3. The first photodetector 32 detects an electric signal indicating light intensity, $$|E_3|^2 = \frac{E_{LO}^2 + E_S^2}{2} + E_{LO} E_S \cos\theta$$

The opposed phase component of the optical pulse train input to the port 1 interferes with the in-phase component of the reference light input to the port 2, whereby output light, $$E_4 = \frac{E_{LO}}{\sqrt{2}} e^{i\omega t} - \frac{E_S}{\sqrt{2}} e^{i(\omega t + \theta)}$$

is output from the port 4. The second photodetector 33 detects an electric signal expressed by light intensity, $$|E_4|^2 = \frac{E_{LO}^2 + E_S^2}{2} - E_{LO} E_S \cos\theta$$

The difference computing unit 34 computes a difference between the detection signal in the first photodetector 32 and the detection signal in the second photodetector 33 to output $2 E_{L\,o} E_s \cos\theta$.

Since the amplitude $E_{L\,o}$ of the reference light is known, a value $\pm E$ including a cosine (in-phase) component (sign only) of the phase and an amplitude is obtained as a measurement result.

The value obtained as a measurement result is an analog value with a sign ($\pm E$). The sign ($\pm$) indicates the phase (0 and $\pi$) and the analog value (E) indicates the amplitude.

Returning to FIG. 3, the arithmetic unit 4 computes an interaction between optical pulses, using information about the phases and amplitudes of the measured optical pulses as an input, based on a coupling coefficient mapped to the Ising model and information about the phases and amplitudes of the other optical pulses. The measurement of optical pulses is done by the arithmetic unit 4 for only a specific component (in-phase component) of the phases and amplitudes.

More specifically, the arithmetic unit 4 makes a computation according to the following formula (6) with the amplitudes and phases of the optical pulse train measured by the measurement unit 3 and the coupling coefficient. As the arithmetic unit 4, for example, an FPGA can be used.

$$\begin{pmatrix} f_1 \\ f_2 \\ f_3 \\ f_4 \\ f_5 \end{pmatrix} = \begin{pmatrix} 0 & J_{12} & J_{13} & J_{14} & J_{15} \\ J_{21} & 0 & J_{23} & J_{24} & J_{25} \\ J_{31} & J_{32} & 0 & J_{34} & J_{35} \\ J_{41} & J_{42} & J_{43} & 0 & J_{45} \\ J_{51} & J_{52} & J_{53} & J_{54} & 0 \end{pmatrix} \begin{pmatrix} c_1 \\ c_2 \\ c_3 \\ c_4 \\ c_5 \end{pmatrix} \quad (6)$$

In the above formula, $c_1$, $c_2$, $c_3$, $c_4$, $c_5$ indicate measurement results of optical pulses in the measurement unit 3 and $f_1$, $f_2$, $f_3$, $f_4$, $f_5$ indicate interactions obtained as computation results. Arithmetic parameters $J_{1\,2}$, $J_{1\,3}$, $J_{1\,4}$, $J_{1\,5}$, $J_{5\,3}$, $J_{5\,4}$ of a matrix are coupling coefficients that describe an Ising model and are determined according to a problem to be solved. However, in the Potts model computing device of the present embodiment, the coupling coefficient is changed multiple times before the provided multivalued problem is solved.

As shown by the above formula, the arithmetic unit 4 makes a computation of multiplying a matrix by a column vector including measurement results in the measurement unit 3, and obtains a column vector that describes interactions between optical pulses. Although an example in which the number of sites equal to the number of optical pulses forming the optical pulse train is five is described here, the size of the square matrix to be used is determined according to the number of sites. The square matrix has a size of (the number of sites)×(the number of sites).

For example, if the number of sites (the number of optical pulses forming the optical pulse train) is N, an interaction computing unit makes a computation of the matrix expressed by the following formula (7), wherein $K_{ij} = J_{ij}^m$, $$\begin{pmatrix} f_{1m} \\ f_{2m} \\ f_{3m} \\ \vdots \\ f_{(N-1)m} \\ f_{Nm} \end{pmatrix} = \begin{pmatrix} 0 & K_{12} & K_{13} & \cdots & K_{1(N-1)} & K_{1N} \\ K_{21} & 0 & K_{23} & \cdots & K_{2(N-1)} & K_{2N} \\ K_{31} & K_{32} & 0 & \cdots & K_{3(N-1)} & K_{3N} \\ \vdots & \vdots & \vdots & \ddots & \vdots & \vdots \\ K_{(N-1)1} & K_{(N-1)2} & K_{(N-1)3} & \cdots & 0 & K_{(N-1)N} \\ K_{N1} & K_{N2} & K_{N3} & \cdots & K_{N(N-1)} & 0 \end{pmatrix} \begin{pmatrix} c_{1m} \\ c_{2m} \\ c_{3m} \\ \vdots \\ c_{(N-1)m} \\ c_{Nm} \end{pmatrix}.$$

The external optical pulse input unit 5 implements the magnitude and sign of an interaction relating to an optical pulse by controlling the amplitude and phase of an optical pulse to be overlapped on an optical pulse in the ring resonator 1 by using the computation result computed based on the phase and amplitude of an optical pulse in which only a specific component of the phase and amplitude is measured. The external optical pulse input unit 5 can be formed, for example, using a laser which controls and outputs the amplitude and phase of an optical pulse. Since the computation result of the specific component of the phase and amplitude is obtained, an interaction of only the specific component of the phase and amplitude is implemented.

More specifically, the external optical pulse input unit 5 generates an external optical pulses having the same frequency as the optical pulse train in the ring resonator 1 in an amplitude and phase proportional to the computation result. For example, the external optical pulse input unit 5 synchronizes and inputs an external pulse of a constant frequency so as to synchronize and input a pulse having a frequency corresponding to that of the optical pulse train in the ring resonator 1. The optical pulse train overlapping with the optical pulse train in the ring resonator 1 yields interaction between the optical pulses in the ring resonator 1 that emulates the interaction between spins.

As described above, according to the configuration of feedback input by the external optical pulse input unit 5, the signal $c'_i(n)$ of the optical pulse train after the feedback can be expressed by the following formula (8) using the cosine (in-phase) component $c_i$ of the i-th optical pulse, the number n of circulations in the resonator, and the rate K of the external pulse.

$$c'_i(n) = c_i(n) + Kf_i(n) \quad (8)$$

In the above formula, the optical pulse train $c'_i(n)$ after the feedback is obtained by overlapping the optical pulse train $c_i(n)$ in the ring resonator 1 with the external optical pulse train (feedback input component), $$\sum_{j}^{N} J_{ij} c_j(n)$$

by the external optical pulse input unit 5 at the coupling rate K.

When input to the PSA 2 again, the optical pulse train $c'_i(n)$ expressed by the above formula is amplified to become an optical pulse train $c_i(n+1)$. The above configuration enables the Potts model computing device to repeatedly obtain a computation result corresponding to the coupling coefficient by bringing the optical pulse train into a stable state according to the problem while repeating the amplification and feedback.

When bringing the optical pulse train into a stable state according to the problem while repeating the amplification and feedback a predetermined number of iteration times, the computation result storage and determination unit 6 stores a computation result of a set of binary Ising spins obtained by substituting the phase of the optical pulse train with a spin value based on the measurement result measured by the measurement unit 3, that is, $(\text{sign}(c-_i) = \pm 1)$.

Further, the computation result storage and determination unit 6 determines that a computation is finished if the amplification and feedback in the above configuration and the computation for bringing about a stable state (setting of the coupling coefficient in the coupling coefficient overwriting unit 7) are repeated a number of iteration times necessary for solving the provided Potts problem. If a possible multivalued value of spin is expressed by $M = 2^{Ms}$, the Potts model computing device of the present embodiment may require Ms times of iterative Ising model computations at minimum. In the end of the (Potts model) computation, a multivalued spin value of the Potts model is finally computed based on the computation results previously stored.

If a predetermined finish condition is satisfied, the computation result storage and determination unit 6 can finish the iteration of Ising model computation even in the case where the number of iteration times of computation is less than Ms. The predetermined finish condition is that 1) the number of iteration reaches m=Ms, 2) a coupling coefficient generated subsequent to obtaining the m-th computation result is $J_{ij}^{m+1}$, m+$^1$=0 (that is, any $\text{sign}(c_{i\,m} c_{j\,m}) = -1$ in (i, j) when $J_{ij}^{m} \neq 0$), or 3) a coupling coefficient generated subsequent to obtaining the m-th computation result is $J_{ij}^{m+1} = J_{ij}^{m}$ (that is, any $\text{sign}(c_{i\,m} c_{j\,m}) = 1$ in (i, j) when $J_{ij}^{m} \neq 0$). When the above condition is satisfied, the iteration of Ising model computation is finished even if the number of iterations is less than Ms. Even if the values of M and Ms for the coupling coefficient are undetermined, the values of M and Ms can be obtained by an algorithm for finishing a computation based on the computation result.

The coupling coefficient overwriting unit 7 repeatedly sets the coupling coefficient to the computing unit 3. More specifically, the coupling coefficient overwriting unit 7 sets the first coupling coefficient at $J_{ij}^{m=1} = J_{ij}$ and sets the second coupling coefficient onward (m+1-th coupling coefficient) at $J_{ij}^{m+1} = J_{ij}^{m} \times (1 + \text{sign}(c_{i\,m} c_{j\,m})) \times \frac{1}{2}$, using a quadrature component $c_{j\,m}$ of the i-th pulse and a quadrature component $c_{j\,m}$ of the j-th pulse of the last (m-th) computation result. This setting makes it possible to regenerate $J_{ij}$ such that a correlation between nodes in which measured spin values do not correspond to each other is excluded from computation targets.

After the coupling coefficient overwriting unit 7 sets the coupling coefficient, a noise optical pulse train is generated again by the PSA 2 to repeat the computation for bringing about a stable state. The computation for bringing about a stable state is repeated Ms times, Ms being a degree when the multivalued spin is expressed in binary (less than Ms times if the finish condition is satisfied), and the computation result storage and determination unit 6 substitutes a set of spin values $\sigma_{i\,m}$ obtained as computation results of the coupling coefficient set multiple times into the formula (5) to obtain a value of multivalued spins to be a solution to the Potts model.

Figure 5:
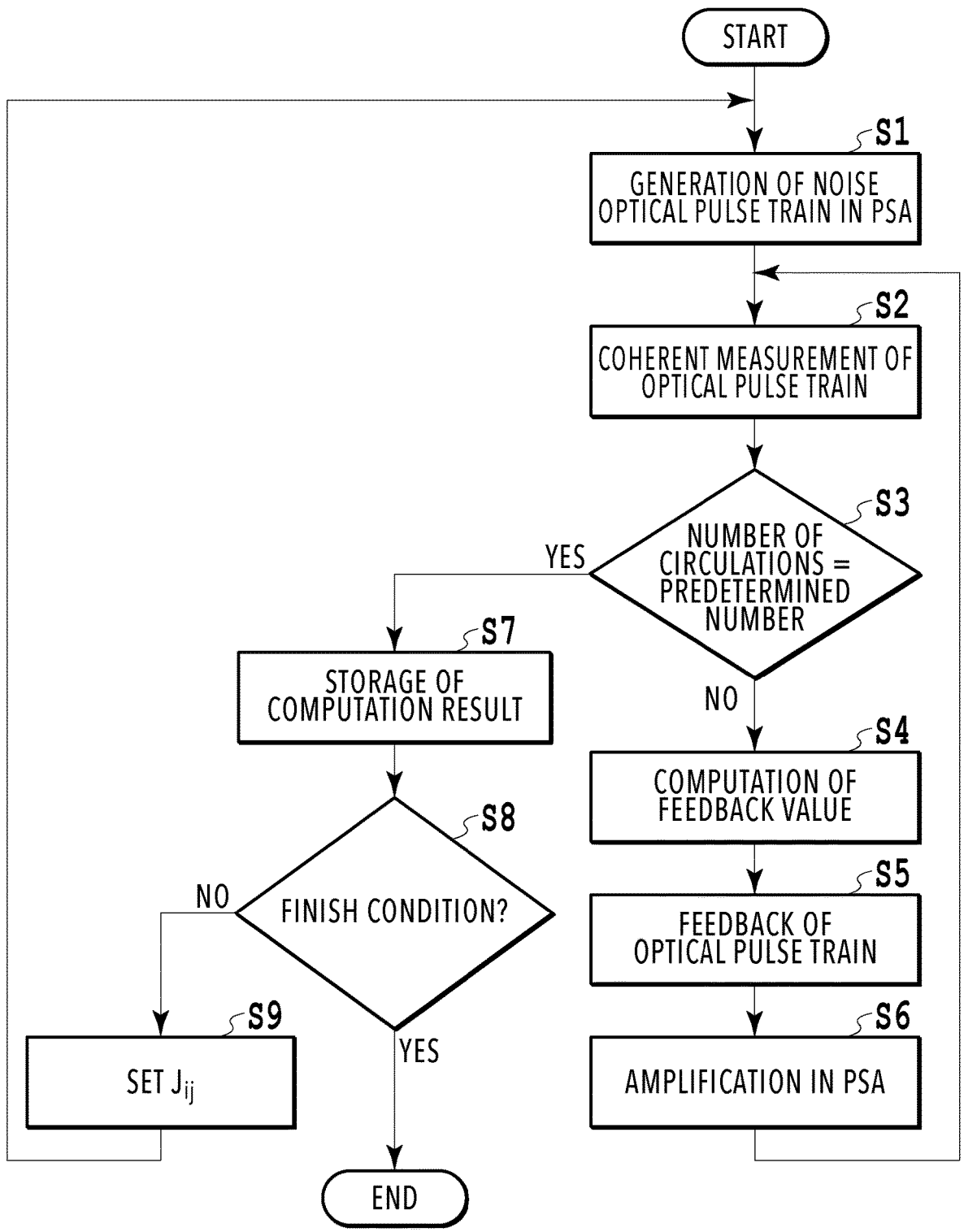
FIG. 5 is a flowchart of processing in the basic configuration of the Ising model computing device.

FIG. 5 is a flowchart of processing in the basic configuration of the Potts model computing device. As shown in FIG. 5, in the Potts model computing device, after the coupling coefficient overwriting unit 7 sets the coupling coefficient (the number of iteration times of setting m=1) at the beginning of a computation of the Potts model, pump light is first injected to the PSA 2, followed by generation of a weak noise optical pulse train (S1). The generated noise optical pulse train circulates and propagates through the ring resonator 1 and partially branches and the amplitudes and phases of the optical pulse train are subjected to a coherent measurement by the measurement unit 3 (S2).

After the measurement result of the optical pulse train is obtained, the arithmetic unit 4 computes an interaction using a matrix to which the coupling coefficient according to a problem to be solved is mapped (S4). Upon receipt of the computation result, the external optical pulse input unit 5 inputs an external optical pulse generated based on the computation result to the ring resonator 1 and overlaps the external optical pulse with the optical pulse train in the ring resonator 1, thereby providing the optical pulse train with a feedback (S5).

The optical pulse train after the feedback is input again to the PSA 2, amplified by the pump light with the optical pulse train (S6), and circulates and propagates again through the ring resonator 1. The coherent measurement, the computation using the matrix, and the feedback according to the computation result are repeatedly performed for the optical pulse train propagating again through the ring resonator 1.

If such an amplification and feedback for the optical pulse train are repeated a predetermined number of iteration times (S3), the optical pulse train is brought into a stable state. The computation result storage and determination unit 6 stores a computation result obtained by bringing about the stable state (obtaining the value of binary spins σ (=±1) from stable optical phase states 0 or π measured by the measurement unit 3) (S7) and determines whether the number of iteration times of Ising model computation reaches to the degree Ms of the problem to be solved and whether the finish condition is satisfied (S8). If the number of iteration times does not reach Ms and the finish condition is not satisfied (S8: No), the computation result storage and determination unit 6 regenerates $J_{ij}$ based on 0 or π, which is the phase state of the measurement result obtained by the measurement unit 3 in the stable state, sets the generated $J_{ij}$ to the arithmetic unit 4 (S9), generates a noise optical pulse train by the PSA 2 again (S1), and repeats the measurement, feedback, and amplification to bring about a stable state (repetition of S1 to S6, that is, repetition of Ising model computation).

Finally, a solution to the provided problem can be obtained by substituting 0 or π, which is the phase state of the measurement result obtained by the measurement unit 3 in the stable state when the number of iteration times the state becomes stable corresponds to the degree of the problem to be solved or the finish condition is satisfied (S8: Yes), with the spin σ state (±1) of the Ising model and mapping it to the problem to be solved again.

In the present embodiment, an example in which the Ising model computing device is formed by the ring resonator 1, the PSA 2, the measurement unit 3, the arithmetic unit 4, and the external optical pulse input unit 5 has been described. However, the configuration of the Ising model computing device is not limited to this.

Second Embodiment

Figure 6:
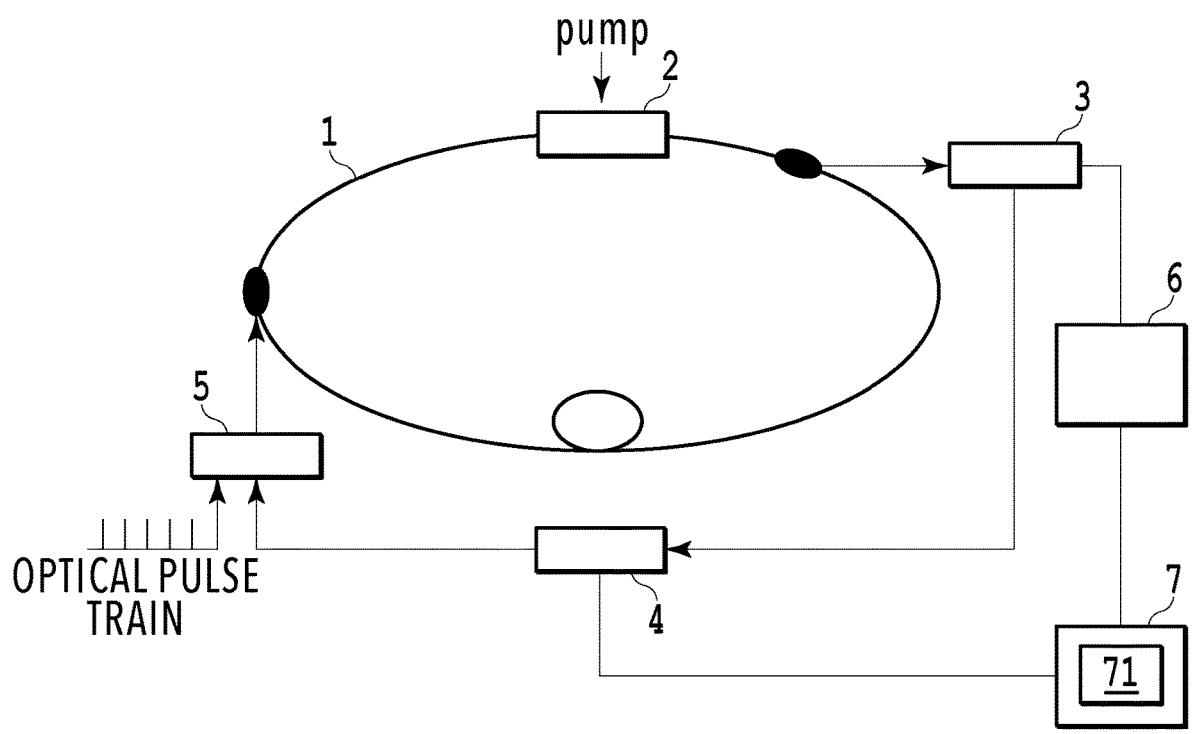
FIG. 6 is a diagram showing a schematic configuration of a Potts model computing device.

FIG. 6 is a diagram showing a schematic configuration of a Potts model computing device of the present embodiment. Although the Potts model computing device of the first embodiment can directly deal with a multivalued number M expressed by $2^{M_s}$, Ms power of 2 (Ms is a natural number), a multivalued number M not satisfying a formula such as M=3 cannot be directly implemented by the Potts model computing device. As shown in FIG. 6, the Potts model computing device of the present embodiment introduces a virtual node having a correlation with all other nodes so as to have a configuration obtained by providing the coupling coefficient overwriting unit 7 with an adjustment unit 71 in the Potts model computing device of the first embodiment. This configuration enables a computation of a problem of a multivalued number not satisfying $M=2^{M_s}$.

The adjustment unit 71 adjusts "the number of nodes," "a possible value of a multivalued spin on each node," and "a correlation between nodes" of a provided problem and sets $J_{ij}$ according to the adjusted problem. More specifically, if such a coupling coefficient that the number of nodes is "N" and a multivalued spin value of each node is M is provided, the adjustment unit 71 determines that a possible value of each node is $2^{M_s}$ determined by the minimum Ms satisfying $M \leq 2^{M_s}$, defines the number of Dn virtual nodes (Dn=$2^{M_s}$−M; M is a natural number), and adds Dn nodes to the original problem with N nodes such that the number of nodes of the problem is (N+Dn). The adjustment unit 71 further maps $J_{ij}$ on the assumption that a newly-introduced virtual nodes have a correlation (coupling) with all the other nodes. For example, if a spin value of each node is different from a spin value of a node in the coupling relationship, since the virtual node has a coupling to all the other nodes, it is clear that a possible value of the virtual node obtained as a solution is different from the values of all the other nodes. Accordingly, the rest of the multivalued values (multivalued values originally set as a problem) are assigned to nodes other than the virtual node.

Figure 7A:
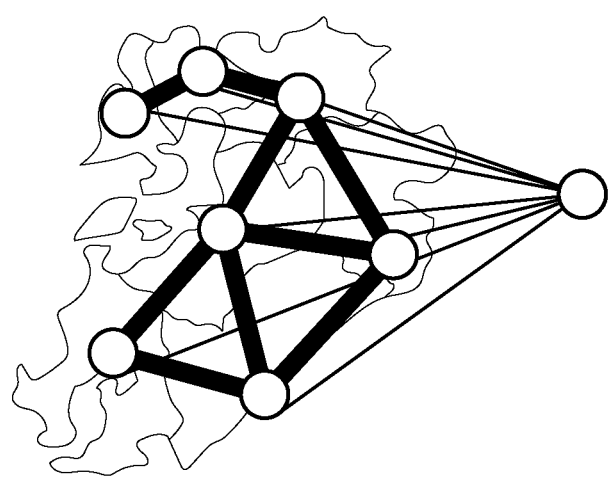
FIG. 7A is a diagram showing a virtual node defined for implementing a problem of a multivalued value Si not satisfying $M=2^{M\,s}$ in the Potts model computing device.
Figure 7B:
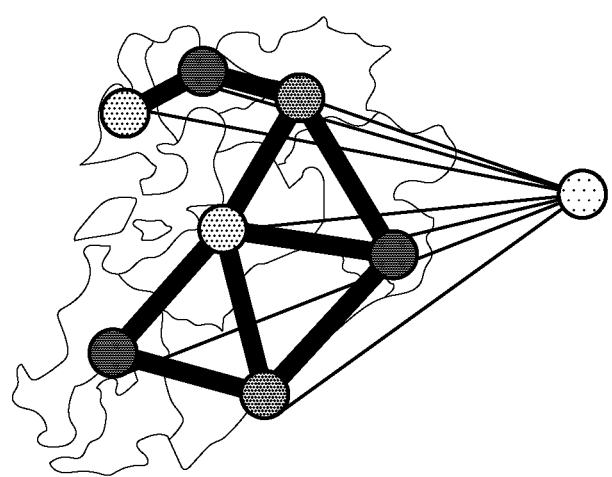
FIG. 7B is a diagram in which the virtual node defined in FIG. 7A is used to apply colors.
Figure 7C:
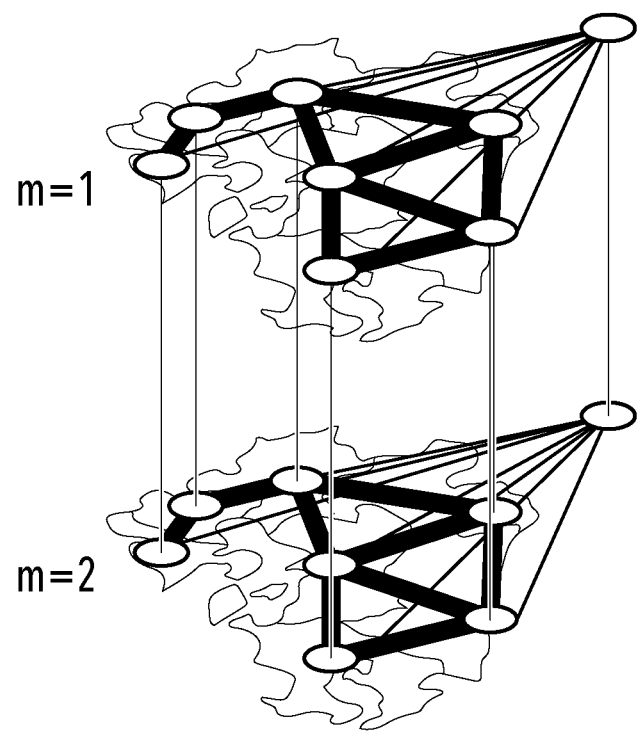
FIG. 7C is a diagram expressing FIG. 7B by layers.

FIG. 7A, FIG. 7B, and FIG. 7C are diagrams showing a method of implementing a problem of a multivalued value Si not satisfying $M=2^{M_s}$ in the Potts model computing device. For example, in the case of solving a coloring problem of coloring seven prefectures of Kyushu (N=7) with three colors, a multivalued number M is 3, which does not satisfy $M=2^{M_s}$. Thus, the problem cannot be directly implemented in the Potts model computing device of the first embodiment.

When a coloring problem of coloring seven prefectures of Kyushu (N=7) with three colors is input, since a possible value is 4 from $M=3 \leq 2^2$ and the number of virtual nodes is Dn=$2^2$−3=1, the adjustment unit 71 defines one virtual node. The adjustment unit 71 generates $J_{ij}$ on the assumption that the number of nodes is 8, which is larger by one (the number of virtual nodes) than the number of nodes input as a problem, and the number of colors to be used for coloring is 4, which is larger by one than the number of colors to be actually used, and maps the generated $J_{ij}$ to the arithmetic unit 4. At this time, as shown in FIG. 7A, the correlation $J_{ij}$ is generated based on the assumption that the virtual node is coupled to all the other nodes. As shown in FIG. 7C, the number of layers of graphs (the number of iteration times of Ising model computation) necessary at this time is 2 from Ms=2.

By this setting, as shown in FIG. 7B, a color different from the colors of the seven other nodes is guided to the virtual node. In other words, three colors are applied to the seven nodes to be colored.

The invention claimed is:

1. A Potts model computing device comprising:
an Ising model computing device;
a computation result storage and determination unit configured to store a value of a set of spins of the Ising model obtained in a case where a coupling coefficient is set in the Ising model computing device and to determine whether a computation is finished; and
a coupling coefficient overwriting unit configured to update a coupling coefficient generated based on the stored value of the set of spins to the Ising model computing device,
wherein, according to values of the spins of the Ising model obtained as a computation result for an m-th time iterative computation using the Ising model computing device, the coupling coefficient overwriting unit generates a coupling coefficient to be set for an (m+1)-th time computation and updates the generated coupling coefficient to the Ising model computing device,
the computation result storage and determination unit determines that a computation is finished in a case where a number of iteration times reaches to Ms (Ms is a natural number), and computes a value $S_i$ by substituting a value $\sigma_{i,m}$ of a spin obtained as a computation result of the m-th time iterative Ising model computation into the following formula to compute a problem mapped to the Potts model using the Ising model computing devices:

$$S_i = \Sigma_{m=1}^{M_s}(1+\sigma_{im})2^{m-2}$$

wherein a possible value of a multivalued spin of the Potts model is $S_i$=0, 1, 2, . . . , M−1 (M is a natural number) and $M \leq 2^{M_s}$.

2. The Potts model computing device according to claim 1, wherein
the Ising model computing device comprises:
a phase sensitive amplifier configured to parametrically oscillate an optical pulse train having a same oscillation frequency in a 0 or π phase, which emulates a set of binary spins of the Ising model;
a ring resonator configured to allow the optical pulse train to circulate and propagate;
an optical pulse measurement unit configured to measure phases and amplitudes of the optical pulse train each time the optical pulse train circulates and propagates through the ring resonator;
an interaction computing unit configured to compute an interaction between optical pulses using information about phases and amplitudes of optical pulses measured in the optical pulse measurement unit as input, the interaction being determined from the coupling coefficient of the Ising model and the measured optical pulses;
an interaction implementation unit configured to implement the interaction between the optical pulse train determined based on the coupling coefficient of the Ising model and the phases and amplitudes of the measured optical pulses by controlling and overlapping amplitudes and phases of optical pulses on the optical pulse train in the interaction computing unit; and
a problem overwriting unit configured to update the coupling coefficient of the Ising model,
in a process of repeating feedback loop control formed by the optical pulse measurement unit, the interaction computing unit, and the interaction implementation unit, the optical pulse measurement unit obtains a spin set of solution of the Ising model by converting the phases of the optical pulse train into binary Ising spins after the optical pulse train reaches a stable state.

3. The Potts model computing device according to claim 2, wherein
the interaction computing unit multiplies a column vector having phases and amplitudes $c_{1\ m}$, $c_{2\ m}$, $c_{3\ m}$, $c_{4\ m}$, $c_{i\ m}$, $c_{(N-1)m}$, $c_{N\ m}$ of N measured optical pulses as elements by the following matrix having coupling coefficients of the Ising model as arithmetic parameters and computes elements $f_{1\ m}$, $f_{2\ m}$, $f_{3\ m}$, $f_{4\ m}$, $f_{i\ m}$, $f_{(N-1)m}$, $f_{N\ m}$ of the obtained column vector Ms times as interactions relating to N optical pulses corresponding to the N optical pulses while varying m from 1 to Ms, wherein $K_{ij} = J_{ij}^{m}$:

$$\begin{pmatrix} f_{1m} \\ f_{2m} \\ f_{3m} \\ \vdots \\ f_{(N-1)m} \\ f_{Nm} \end{pmatrix} = \begin{pmatrix} 0 & K_{12} & K_{13} & \cdots & K_{1(N-1)} & K_{1N} \\ K_{21} & 0 & K_{23} & \cdots & K_{2(N-1)} & K_{2N} \\ K_{31} & K_{32} & 0 & \cdots & K_{3(N-1)} & K_{3N} \\ \vdots & \vdots & \vdots & \ddots & \vdots & \vdots \\ K_{(N-1)1} & K_{(N-1)2} & K_{(N-1)3} & \cdots & 0 & K_{(N-1)N} \\ K_{N1} & K_{N2} & K_{N3} & \cdots & K_{N(N-1)} & 0 \end{pmatrix} \begin{pmatrix} c_{1m} \\ c_{2m} \\ c_{3m} \\ \vdots \\ c_{(N-1)m} \\ c_{Nm} \end{pmatrix}.$$

4. The Potts model computing device of claim 1, wherein the computation result storage and determination unit determines that a computation is finished in a case where the computation result storage and determination unit determines that any one of the following conditions is satisfied: 1) the Ising model computation is repeated N times; 2) a coupling coefficient generated subsequent to obtaining the m-th computation result is $J_{ij}^{m+1}=0$; and 3) a coupling coefficient generated subsequent to obtaining the m-th computation result is $J_{ij}^{m+1}=J_{ij}^{m}$.

5. The Potts model computing device of claim 2, wherein the computation result storage and determination unit determines that a computation is finished in a case where the computation result storage and determination unit determines that any one of the following conditions is satisfied: 1) the Ising model computation is repeated N times; 2) a coupling coefficient generated subsequent to obtaining the m-th computation result is $J_{ij}^{m+1}=0$; and 3) a coupling coefficient generated subsequent to obtaining the m-th computation result is $J_{ij}^{m+1}=J_{ij}^{m}$.

6. The Potts model computing device of claim 3, wherein the computation result storage and determination unit determines that a computation is finished in a case where the computation result storage and determination unit determines that any one of the following conditions is satisfied: 1) the Ising model computation is repeated N times; 2) a coupling coefficient generated subsequent to obtaining the m-th computation result is $J_{ij}^{m+1}=0$; and 3) a coupling coefficient generated subsequent to obtaining the m-th computation result is $J_{ij}^{m+1}=J_{ij}^{m}$.

* * * * *